US012724781B2

(12) United States Patent
Madison et al.

(10) Patent No.: US 12,724,781 B2
(45) Date of Patent: Sep. 1, 2026

(54) DATA EXTRACTION USING ALERT-BASED PREDICATE FILTERING

(71) Applicant: International Business Machines Corporation, Armonk, NY (US)

(72) Inventors: Hunter Madison, Reston, VA (US); David Kumhyr, Austin, TX (US); Kyle Cooley, Austin, TX (US); Nikki Elyse Robinson, Davidsonville, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/024,182

(22) Filed: Jan. 16, 2025

(65) Prior Publication Data

US 2026/0203290 A1 Jul. 16, 2026

(51) Int. Cl.
*G06F 16/215* (2019.01)
*G06F 16/2455* (2019.01)
*G06F 21/55* (2013.01)
*G06F 21/62* (2013.01)

(52) U.S. Cl.
CPC ........ *G06F 16/2456* (2019.01); *G06F 16/215* (2019.01); *G06F 21/554* (2013.01); *G06F 21/6218* (2013.01)

(58) Field of Classification Search
CPC ............... G06F 16/2456; G06F 21/554; G06F 21/6218; G06F 16/215
See application file for complete search history.

(56) References Cited

U.S. PATENT DOCUMENTS 6,195,794 B1 2/2001 Buxton
8,286,133 B2 * 10/2012 Natanov ............ G06F 11/3684 717/124
9,197,590 B2 11/2015 Beausoleil et al.
11,537,390 B2 12/2022 Roy et al.
11,620,303 B1 * 4/2023 Roy ..................... G06F 16/313 707/736
11,893,016 B1 2/2024 Geng et al.
11,902,306 B1 * 2/2024 Satish ................ H04L 63/1425
2012/0330880 A1 12/2012 Arasu et al.
2014/0351229 A1 * 11/2014 Gupta .................. H03M 7/607 707/693

(Continued)

OTHER PUBLICATIONS

"Transmittal letter", for U.S. Appl. No. 19/024,182, filed Jan. 16, 2025, 1 page.

(Continued)

*Primary Examiner* — Tarek Chbouki
(74) *Attorney, Agent, or Firm* — Harrity & Harrity, LLP

(57) ABSTRACT

A processor set may generate a set of selection predicates based on one or more alerting rules for security risk detection in remote data from a remote system. The processor set may determine one or more data metrics based on sample data from the remote system. The processor set may remove one or more selection predicates, from the set of selection predicates, to generate a one or more filter predicates. The processor set may transmit, to the remote system, a request that is based on the one or more selection predicates and the one or more filter predicates. The processor set may receive, from the remote system, filtered data based on the request. The processor set may store the second data in a local system.

20 Claims, 7 Drawing Sheets

(56) References Cited

U.S. PATENT DOCUMENTS

| | | | | |
|---|---|---|---|---|
| 2019/0340283 | A1* | 11/2019 | Schneider | G06F 16/24542 |
| 2020/0007156 | A1* | 1/2020 | Fenney | G06T 1/60 |
| 2022/0309163 | A1* | 9/2022 | Purushothaman | G06F 21/31 |
| 2023/0055992 | A1* | 2/2023 | Vinayagamurthy | G06F 21/6245 |
| 2023/0229540 | A1* | 7/2023 | King | G06F 11/3476 714/57 |
| 2023/0229717 | A1* | 7/2023 | Diehl | H04L 63/1408 707/770 |
| 2024/0364637 | A1* | 10/2024 | Filipov | H04L 47/32 |
| 2025/0274469 | A1* | 8/2025 | Bar On | H04L 63/1425 |

OTHER PUBLICATIONS

Ilyas et al., "CORDS: automatic discovery of correlations and soft functional dependencies", SIGMOD, Jun. 13, 2004, pp. 647-658.

Khayyat et al., "BigDansing: A System for Big Data Cleansing", SIGMOD '15: Proceedings of the 2015 ACM SIGMOD International Conference on Management of Data, May 27, 2015, pp. 1215-1230.

Klabe et al., "PatchIndex: exploiting approximate constraints in distributed databases", Distrib Parallel Databases , 2021, pp. 833-853.

Kruse et al., "Efficient Discovery of Approximate Dependencies", Proceedings of the VLDB Endowment, 2018, pp. 759-772.

Snowflake Inc., "Secure predicate derivation of queries using metadata", https://patents.justia.com/patent/11893016, Oct. 26, 2022, 34 pages.

Unterbrunner et al., "Predictable Performance for Unpredictable Workloads", Proceedings of the VLDB Endowment, Aug. 2009, pp. 706-717.

Wang et al., "Efficient privacy preserving predicate encryption with fine-grained searchable capability for Cloud storage", Computers & Electrical Engineering, Nov. 2016, pp. 871-883.

* cited by examiner

DATA EXTRACTION USING ALERT-BASED PREDICATE FILTERING

BACKGROUND

This disclosure relates to computing systems, and more specifically, to data extraction using alert-based predicate filtering.

SUMMARY

Some implementations described herein relate to a computer-implemented method. The computer-implemented method may include generating, by a processor set, a set of selection predicates based on one or more alerting rules for security risk detection in remote data from a remote system, where the one or more alerting rules include one or more data queries, and where the one or more data queries indicate the set of selection predicates. The computer-implemented method may include determining, by the processor set, one or more data metrics based on sample data from the remote system, where the one or more data metrics include a data structure and data statistics associated with the remote system. The computer-implemented method may include removing, by the processor set, one or more selection predicates, from the set of selection predicates, to generate one or more filter predicates, where the one or more selection predicates are configured to query one or more fields that satisfy one or more removal conditions based on the one or more data metrics. The computer-implemented method may include transmitting, by the processor set and to the remote system, a request that is based on the set of selection predicates and the one or more filter predicates. The computer-implemented method may include receiving, by the processor set and from the remote system, filtered data based on the request. The computer-implemented method may include storing, by the processor set, the filtered data in a local system.

Some implementations described herein relate to a computer system. The computer system may include a processor set, one or more computer-readable storage media, and program instructions stored on the one or more computer-readable storage media to cause the processor set to perform operations. The operations may include generating a set of selection predicates based on one or more alerting rules, where the one or more alerting rules include one or more data queries, and where the one or more data queries include the set of selection predicates. The operations may include performing a pre-sampling operation to determine one or more data metrics based on sample data from a remote system. The operations may include removing one or more selection predicates, from the set of selection predicates, to generate a one or more filter predicates, where the one or more selection predicates are configured to query one or more fields that satisfy one or more removal conditions based on the one or more data metrics. The operations may include transmitting, to the remote system, a request that is based on the set of selection predicates and the one or more filter predicates. The operations may include receiving, from the remote system, filtered data based on the request. The operations may include performing an action using the filtered data.

Some implementations described herein relate to a computer program product. The computer program product may include one or more computer-readable storage media and program instructions stored on the one or more computer-readable storage media to perform operations. The operations may include generating a set of selection predicates based on one or more alerting rules, where the one or more alerting rules include one or more data queries, and where the one or more data queries include the set of selection predicates. The operations may include performing a pre-sampling operation to determine one or more data metrics based on sample data from a remote system. The operations may include removing one or more selection predicates, from the set of selection predicates, to generate a one or more filter predicates, where the one or more selection predicates are configured to query one or more fields that satisfy one or more removal conditions based on the one or more data metrics. The operations may include transmitting, to the remote system, a request that is based on the set of selection predicates and the one or more filter predicates. The operations may include receiving, from the remote system filtered data based on the request. The operations may include storing the filtered data in a local cache.

DETAILED DESCRIPTION

Figure 1:
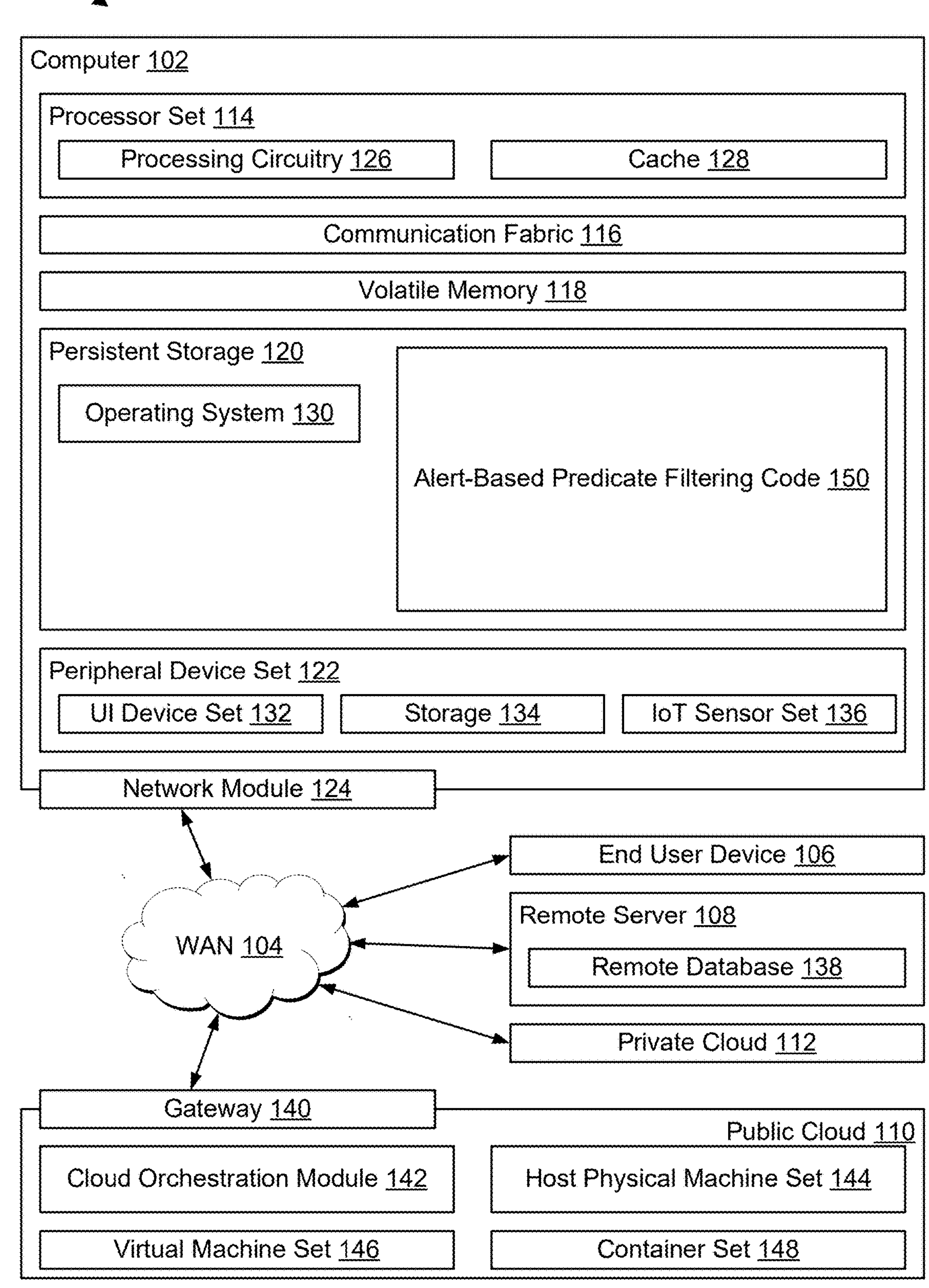
FIG. 1 is a diagram of an example computing environment for data extraction using alert-based predicate filtering described herein.

The following detailed description of example implementations refers to the accompanying drawings. The same reference numbers in different drawings may identify the same or similar elements.

Cloud-based data storage and analysis have become increasingly important for organizations, but the associated demands on network resources have also increased. As the amount of data being collected and analyzed continues to grow, the repetitive transfer of data between cloud environments has become a significant factor, such as for security-related logging and analysis. For example, a system may obtain and/or analyze log data from multiple systems (e.g., multiple cloud computing services and/or systems) to detect security threats, vulnerabilities, and/or other security related metrics. To obtain and/or analyze the log data, the system may repeatedly communicate and/or interact with the multiple systems to obtain the log data (e.g., may repeatedly perform the same or similar searches across the multiple systems). This results in increased network congestion and latency. For example, current methods of data analysis often involve repetitive queries on large datasets, leading to an increase in network traffic and increased usage of network resources.

Additionally, the increasing adoption of multi-cloud models (e.g., in which a system includes multiple cloud computing services supported by different cloud providers) and hybrid-cloud models (e.g., in which a system integrates on-premise infrastructure with one or more cloud computing services) has compounded the problems related to network resource utilization for data transfer and analysis. Current methods of data analysis, such as federated search, can be network-intensive and inefficient, as such methods may use repeated queries on multiple cloud providers. This may consume network resources, processing resources, and/or memory resources. Additionally, this may result in increased network latency, and/or increased network congestion, among other examples.

Moreover, the increasing reliance on automated data analysis workflows and the consequent reduction in human oversight have resulted in inadequate governance of network resource allocation for data retrieval and transmission. For example, an amount or type of data used for analysis may vary from use case to use case (e.g., an amount of data used to analyze security risks or vulnerabilities may vary depending on the context and/or use case). This may result in inefficiencies in network resource utilization because user-initiated searches and/or manipulation of data may still be performed after an automated operation is performed to obtain the data (e.g., because the automated operation may not retrieve enough data and/or the correct data).

Some implementations described herein enable data extraction using alert-based predicate filtering. In some implementations, a computer system may perform data extraction for security risk detection in remote data from a remote system using selection predicates and filter predicates that are based on one or more alerting rules. In the context of data analysis and query languages, a predicate is a logical expression that evaluates to true or false and is used to filter or select data based on specific conditions or criteria. In other words, a predicate is a statement that defines a condition or rule that must be met in order for a piece of data to be included in a query result or analysis. In some implementations, the computer system may generate a set of selection predicates based on one or more alerting rules for security risk detection in remote data from a remote system. A selection predicate may be a predicate used to select or obtain data from the remote system (such as a predicate used to identify one or more fields, columns, and/or data objects to be retrieved from a data set). The computer system may perform a pre-sampling operation to determine one or more data metrics based on sample data from the remote system. The computer system may remove one or more selection predicates from the set of selection predicates to generate a one or more filter predicates. A filter predicate may be a predicate used to filter selected and/or obtained data (e.g., that is obtained based on the one or more selection predicates). The computing system may transmit a request that is based on the set of selection predicates and the one or more filter predicates (e.g., may "push down" predicates to the remote system as indicated by the set of selection predicates and the one or more filter predicates). The computer system may receive or obtain filtered data based on the request (e.g., that is filtered based on the one or more filter predicates). The computer system may store the filtered data in a local system (e.g., a local cache) that is accessible by an end user device. In some implementations, the computer system may analyze the filtered data (e.g., to detect one or more security risks, vulnerabilities, and/or other security-based events).

In some implementations, a selection predicate may be configured to query or access a field. To generate the one or more filter predicates, the computer system may remove a selection predicate, from the one or more selection predicates, that is configured to query one or more fields that satisfy one or more removal conditions based on the one or more data metrics. The one or more removal conditions may be based on one or more network efficiency conditions, such as a data compression condition, and/or a file path condition, among other examples. For example, the computer system may remove a selection predicate that is configured to query a field for which the one or more data metrics (e.g., indicated by the sample data) indicate can be compressed and/or is accessible without querying or accessing the full data set, among other examples.

As a result, the computer system improves the network resource utilization efficiency for data extraction that is based on alerting rule(s), thereby conserving network resources, reducing latency, and/or improving network performance, among other examples. For example, the computer system may reduce data transfer between the local system and the remote system by optimizing the extraction process with targeted selection predicate(s) and filter predicate(s). For example, by the computer system obtaining the first data using the one or more selection predicates, the computer system can improve the likelihood that all of the data requested or indicated by the one or more alerting rules is obtained from the remote system.

Additionally, by the computer system causing the data to be filtered using the one or more filter predicates, the computer system may obtain a variable amount of supporting data in addition to the data requested or indicated by the one or more alerting rules. By including the supporting data in the second data (e.g., based on the computer system removing one or more selection predicates to generate the filter predicate(s)), the computer system enables more thorough and effective post-alert analysis of the second data (e.g., because the second data may include contextual and/or supporting data), which can lead to improved incident response, reduced mean time to detect (MTTD), and/or reduced mean time to respond (MTTR), among other examples. Further, by the computer system removing selection predicate(s) based on the one or more data metrics of the sample data, the computer system may tailor the type and/or amount of supporting data that is included in the second data based on the data that is actually being obtained from the remote system. This may improve the network resource utilization efficiency of the data extraction process because the computer system may remove selection predicate(s) that query fields that have a data metric which satisfy or meet one or more network efficiency conditions. This results in the supporting data that is included in the second data having improved network resource utilization during data extraction.

FIG. 1 is a diagram of an example computing environment 100 for data extraction using alert-based predicate filtering described herein.

Computing environment 100 contains an example of an environment for the execution of at least some of the computer code involved in performing the inventive methods, such as alert-based predicate filtering code 150. In addition to alert-based predicate filtering code 150, computing environment 100 includes, for example, computer 102, wide area network (WAN) 104, end user device (EUD) 106, remote server 108, public cloud 110, and private cloud 112. In this embodiment, computer 102 includes processor set 114 (including processing circuitry 126 and cache 128), communication fabric 116, volatile memory 118, persistent storage 120 (including operating system 130 and alert-based predicate filtering code 150, as identified above), peripheral device set 122 (including user interface (UI) device set 132, storage 134, and Internet of Things (IoT) sensor set 136), and network module 124. Remote server 108 includes remote database 138. Public cloud 110 includes gateway 140, cloud orchestration module 142, host physical machine set 144, virtual machine set 146, and container set 148.

Computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 138. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

Processor set 114 includes one, or more, computer processors of any type now known or to be developed in the future. Processing circuitry 126 may be distributed over multiple packages, for example, multiple, coordinated integrated circuit chips. Processing circuitry 126 may implement multiple processor threads and/or multiple processor cores. Cache 128 is memory that is located in the processor chip package(s) and is typically used for data or code that should be available for rapid access by the threads or cores running on processor set 114. Cache memories are typically organized into multiple levels depending upon relative proximity to the processing circuitry. Alternatively, some, or all, of the cache for the processor set may be located "off chip." In some computing environments, processor set 114 may be designed for working with qubits and performing quantum computing.

Computer-readable program instructions are typically loaded onto computer 102 to cause a series of operational steps to be performed by processor set 114 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 128 and the other storage media discussed below. The program instructions, and associated data, are accessed by processor set 114 to control and direct performance of the inventive methods. In computing environment 100, at least some of the instructions for performing the inventive methods may be stored in alert-based predicate filtering code 150 in persistent storage 120.

Communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 118 is any type of volatile memory now known or to be developed in the future. Examples include dynamic type random access memory (RAM) or static type RAM. Typically, volatile memory 118 is characterized by random access, but this is not required unless affirmatively indicated. In computer 102, the volatile memory 118 is located in a single package and is internal to computer 102, but, alternatively or additionally, the volatile memory may be distributed over multiple packages and/or located externally with respect to computer 102.

Persistent storage 120 is any form of non-volatile storage for computers that is now known or to be developed in the future. The non-volatility of this storage means that the stored data is maintained regardless of whether power is being supplied to computer 102 and/or directly to persistent storage 120. Persistent storage 120 may be a read only memory (ROM), but typically at least a portion of the persistent storage allows writing of data, deletion of data and re-writing of data. Some familiar forms of persistent storage include magnetic disks and solid state storage devices. Operating system 130 may take several forms, such as various known proprietary operating systems or open source Portable Operating System Interface-type operating systems that employ a kernel.

The code included in the alert-based predicate filtering code 150 typically includes at least some of the computer code involved in performing one or more operations described herein. The operations may include, for example, generating a set of selection predicates based on one or more alerting rules for security risk detection in remote data from a remote system; determining one or more data metrics based on sample data from the remote system; removing one or more selection predicates, from the set of selection predicates, to generate a one or more filter predicates; obtaining first data from the remote system based on the one or more selection predicates; filtering the first data based on the one or more filter predicates to obtain second data; and/or storing the second data in a local system.

The operations may include, for example, generating a set of selection predicates based on one or more alerting rules; performing a pre-sampling operation to determine one or more data metrics based on sample data from a remote system; removing one or more selection predicates, from the set of selection predicates, to generate a one or more filter predicates; obtaining first data from the remote system based on the one or more selection predicates; filtering the first data based on the one or more filter predicates to obtain second data; and/or performing an action using the second data.

Peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 132 may include components such as a display screen, speaker, microphone, wearable devices (such as goggles and smart watches), keyboard, mouse, printer, touchpad, game controllers, and haptic devices. Storage 134 is external storage, such as an external hard drive, or insertable storage, such as an SD card. Storage 134 may be persistent and/or volatile. In some embodiments, storage 134 may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. IoT sensor set 136 is made up of sensors that can be used in Internet of Things applications. For example, one sensor may be a thermometer and another sensor may be a motion detector.

Network module 124 is the collection of computer software, hardware, and firmware that allows computer 102 to communicate with other computers through WAN 104. Network module 124 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 124 are performed on the same physical hardware device. In other embodiments (for example, embodiments that utilize software-defined networking (SDN)), the control functions and the forwarding functions of network module 124 are performed on physically separate devices, such that the control functions manage several different network hardware devices. Computer-readable program instructions for performing the inventive methods can typically be downloaded to computer 102 from an external computer or external storage device through a network adapter card or network interface included in network module 124.

WAN 104 is any wide area network (for example, the internet) capable of communicating computer data over non-local distances by any technology for communicating computer data, now known or to be developed in the future. In some embodiments, the WAN 104 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 106 is any computer system that is used and controlled by an end user (for example, a customer of an enterprise that operates computer 102), and may take any of the forms discussed above in connection with computer 102. EUD 106 typically receives helpful and useful data from the operations of computer 102. For example, in a hypothetical case where computer 102 is designed to provide a recommendation to an end user, this recommendation would typically be communicated from network module 124 of computer 102 through WAN 104 to EUD 106. In this way, EUD 106 can display, or otherwise present, the recommendation to an end user. In some embodiments, EUD 106 may be a client device, such as thin client, heavy client, mainframe computer, desktop computer and so on.

Remote server 108 is any computer system that serves at least some data and/or functionality to computer 102. Remote server 108 may be controlled and used by the same entity that operates computer 102. Remote server 108 represents the machine(s) that collect and store helpful and useful data for use by other computers, such as computer 102. For example, in a hypothetical case where computer 102 is designed and programmed to provide a recommendation based on historical data, then this historical data may be provided to computer 102 from remote database 138 of remote server 108.

Public cloud 110 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 110 is performed by the computer hardware and/or software of cloud orchestration module 142. The computing resources provided by public cloud 110 are typically implemented by virtual computing environments that run on various computers making up the computers of host physical machine set 144, which is the universe of physical computers in and/or available to public cloud 110. The virtual computing environments (VCEs) typically take the form of virtual machines from virtual machine set 146 and/or containers from container set 148. It is understood that these VCEs may be stored as images and may be transferred among and between the various physical machine hosts, either as images or after instantiation of the VCE. Cloud orchestration module 142 manages the transfer and storage of images, deploys new instantiations of VCEs and manages active instantiations of VCE deployments. Gateway 140 is the collection of computer software, hardware, and firmware that allows public cloud 110 to communicate through WAN 104.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 112 is similar to public cloud 110, except that the computing resources are only available for use by a single enterprise. While private cloud 112 is depicted as being in communication with WAN 104, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 110 and private cloud 112 are both part of a larger hybrid cloud.

Cloud computing services and/or microservices (not separately shown in FIG. 1): private and public clouds 110 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

FIG. 1 is provided as an example. Other examples may differ from what is described with regard to FIG. 1.

Figure 2:
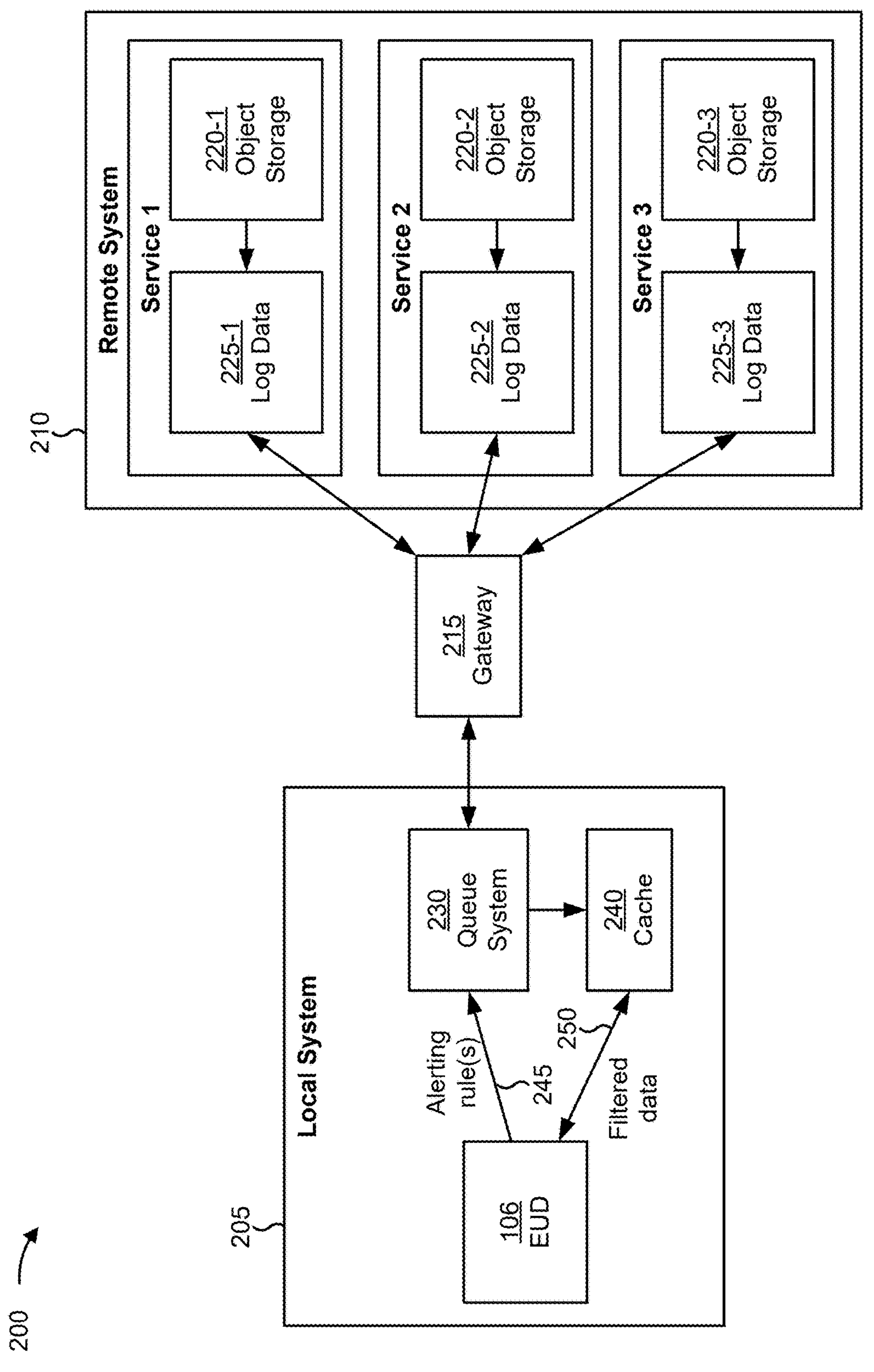
FIG. 2 is a diagram of an example environment including a local system and a remote system described herein.

FIG. 2 is a diagram of an example environment 200 including a local system 205 and a remote system 210 described herein. The local system 205 may include one or more components of FIG. 1. For example, the local system 205 may include one or more computers 102. For example, an operation depicted and/or described herein as being performed by the local system 205 may be performed by one or more components of FIG. 1, such as one or more computers 102, and/or one or more processor sets 114, among other examples.

The remote system 210 may include one or more cloud computing systems, such as one or more public clouds 110, and/or one or more private clouds 112, among other examples. Additionally, or alternatively, the remote system 210 may include other systems or devices, such as one or more remote servers 108, and/or one or more remote databases 138, among other examples. The remote system 210 may be "remote" from the local system 205 in that devices, systems, and/or components included in the local system 205 may need to communicate over a network (e.g., a WAN 104) to access and/or communicate with devices, systems, and/or components included in the remote system 210. For example, as shown in FIG. 2, the local system 205 and the remote system 210 may communicate via a gateway 215, such as the gateway 140. Additionally, or alternatively, the remote system 210 may be "remote" from the local system 205 in that the local system 205 and the remote system 210 are managed and/or configured by different service providers and/or organizations (e.g., the local system 205 may be managed and/or configured by a first service provider or organization and the remote system 210 may be managed and/or configured by one or more second service providers or organizations). One or more devices, systems, and/or components included in the local system 205 may be "local" to each other in that the devices, systems, and/or components may communicate and/or access stored information without communicating over an external network (e.g., a WAN 104).

As shown in FIG. 2, the remote system 210 may include one or more services, shown as service 1, service 2, and service 3 as an example. In some examples, each service may be associated with a given cloud computing system (e.g., the service 1 may be provided by a first cloud computing system, the service 2 may be provided by a second cloud computing system, and the service 3 may be provided by a third cloud computing system). Each service may be associated with one or more dedicated systems, applications, infrastructure components, platforms, and/or databases, among other examples.

In some examples, each service may include object storage 220 (shown in FIG. 2 as object storage 220-1, object storage 220-2, and object storage 220-3). Object storage 220 may be a type of data storage where data is stored and managed as objects. An object (or data object) may be a discrete unit of data that is associated with metadata and can be easily stored, retrieved, and/or manipulated, among other examples. This enables scalable and flexible storage solutions. In other examples, different types of data storage may be used by the service(s) and/or the remote system 210.

As shown in FIG. 2, each service may generate log data 225 (shown as log data 225-1, log data 225-2, and log data 225-3). When data is stored in object storage 220, one or more interactions with the data, such as uploading, downloading, and/or modifying, among other examples, may cause the creation of a piece of log data 225 that captures detailed information about the one or more interactions. Log data 225 can include a timestamp, a user identifier (ID), an object name, an operation type, an Internet protocol (IP) address, a status code, and/or other relevant metadata for the one or more interactions. The log data 225 may be automatically generated by a service and can be used for security analysis, auditing, monitoring, analytics, and/or other purposes, providing insights into data access patterns, usage trends, and/or system performance for a given service and/or the remote system 210. The log data 225 may be stored in a separate log storage system or database in each service, enabling improved querying, analysis, and/or visualization of the log data 225.

The local system 205 may use the log data 225 for security analysis associated with the remote system 210. For example, the log data 225 may be transmitted to the local system 205 via a network (e.g., a WAN 104) and/or the gateway 215. One or more EUDs 106 and/or other device(s) or system(s) in the local system may access and/or analyze the log data 225 to detect one or more events, security risks or threats, vulnerabilities, and/or anomalies, among other examples, in the remote system 210. The local system 205 may include a queue system 230. The queue system 230 may include a data structure and/or component that enables handling and processing of data requests and responses between the local system 205 and the remote system 210. The queue system 230 may serve as a buffer, holding requests for data from the local system 205 and allowing the remote system 210 to process them in a first-in-first-out (FIFO) order. This enables the remote system 210 to manage and prioritize the requests, ensuring that data is retrieved and transmitted in an organized and efficient manner. The local system 205 may include one or more local storage locations, such as a cache 240. The cache 240 may be a local storage location for storing log data 225 from the remote system 210 for analysis, such as by one or more EUDs 106.

As described herein, the local system 205 may use alert-based predicate filtering to improve the efficiency of collecting, storing, and/or analyzing data (e.g., the log data 225), such as for security analysis associated with the remote system 210. For example, the local system 205 may apply one or more selection predicates and/or one or more filter predicates to obtain and filter data (e.g., the log data 225) from the remote system 210. The one or more selection predicates and/or one or more filter predicates may be based on one or more alerting rules and/or data metric(s) of data obtained from the remote system 210. An alerting rule may indicate one or more conditions that, when met, triggers an alert or notification to indicate a potential security threat or anomaly. The alerting rule(s) may be used by the local system 205 and/or an EUD 106 to identify and flag suspicious activity, such as unusual network traffic, login attempts, and/or system behavior, allowing security teams to quickly respond and investigate potential security incidents associated with the remote system 210. Alerting rules can be based on various criteria, such as threshold-based rules that trigger an alert when a specific threshold is exceeded, anomaly-based rules that identify patterns of behavior that deviate from established norms, signature-based rules that match specific patterns or signatures of known security threats, and/or behavioral rules that monitor system or user behavior and trigger an alert when suspicious activity is detected, among other examples.

For example, as shown by reference number 245, an EUD 106 may provide, and the queue system 230 may obtain, one or more alerting rules for the remote system 210. The local system 205 may use the one or more altering rules to generate the one or more selection predicates and/or one or more filter predicates to obtain and/or filter log data 225 from the remote system. The filtered data (e.g., the filtered log data 225) may be stored in a local storage location in the local system 205, such as in the cache 240. For example, as shown by reference number 250, an EUD 106 may access, manipulate, and/or otherwise interact with the filtered data stored in the cache 240. Because the one or more selection predicates and/or one or more filter predicates enable the local system 205 to improve the likelihood that all of the data requested or indicated by the one or more alerting rules is obtained from the remote system 205, the amount of processing performed by the EUD 106 to access and/or manipulate data to evaluate the one or more alerting rules is reduced. Additionally, by the local system 205 filtering the data (e.g., the log data 225) using the one or more filter predicates, the local system 205 may obtain and store (e.g., in the cache 240) a variable amount of supporting data in addition to the data requested or indicated by the one or more alerting rules. By including the supporting data in the data stored in the cache 240, the local system 205 can enable more thorough and effective post-alert analysis of the data (e.g., because the second data may include contextual and/or supporting data), such as by one or more EUDs 106. This conserves network resources, processing resources, and/or reduces latency, among other examples, that would have otherwise been associated with the one or more EUDs 106 causing one or more messages or requests to be transmitted between the local system 205 and the remote system 210 (e.g., via a network (e.g., a WAN 104) and/or the gateway 215) to analyze the data (e.g., the log data 225).

FIG. 2 is provided as an example. Other examples may differ from what is described with regard to FIG. 2.

Figure 3A:
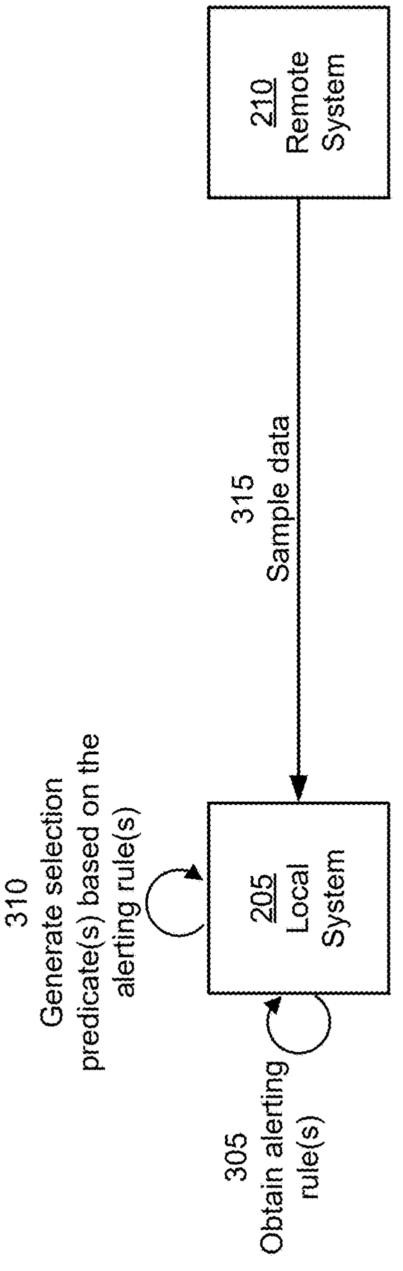
FIGS. 3A-3C are diagrams of an example associated with data extraction using alert-based predicate filtering described herein.
Figure 3A:
Figure 3B:
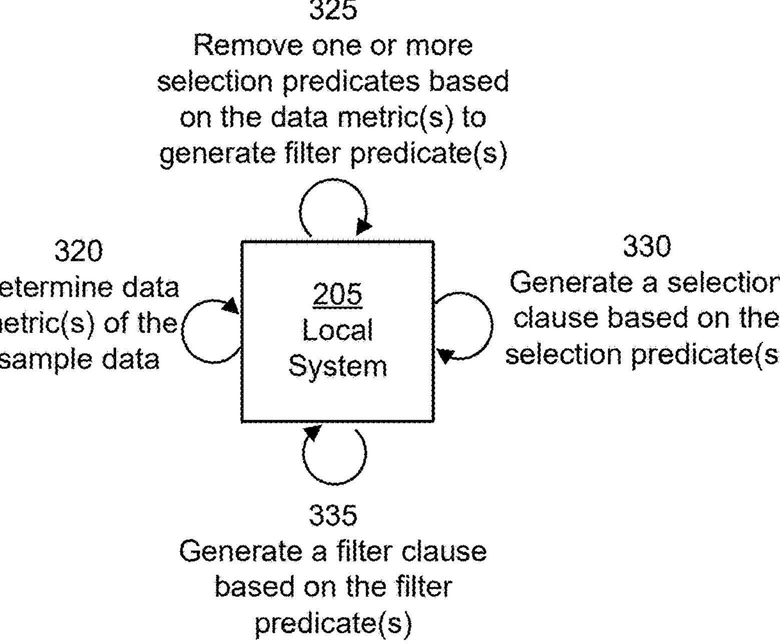
Figure 3C:
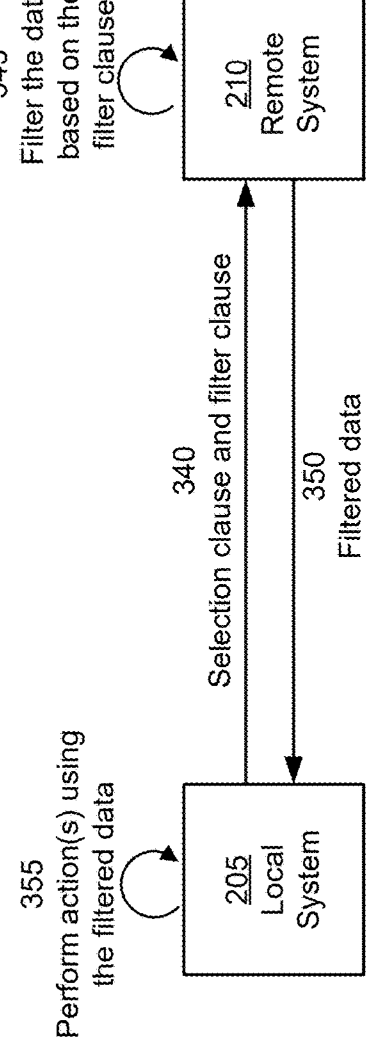

FIGS. 3A-3C are diagrams of an example 300 associated with data extraction using alert-based predicate filtering described herein. As shown in FIGS. 3A-3C, example 300 includes the local system 205 and the remote system 210. These systems are described in more detail in connection with FIGS. 1, 2, and 4.

As shown in FIG. 3A, and by reference number 305, the local system may obtain one or more alerting rules. The one or more alerting rules may be for security risk detection in remote data (e.g., log data 225) from the remote system 210. For example, the one or more alerting rules may define one or more conditions that, when met, triggers an alert or notification to indicate a potential security threat or anomaly, as described in more detail elsewhere herein. In some implementations, the local system 205 may obtain the one or more alerting rules from a security configuration. For example, the security configuration may be provided by an EUD 106 in the local system 205. For example, the alerting rules may be generated by security monitoring teams and/or system that analyze data (e.g., log data 225) to identify security concerns or vulnerabilities, such as failed login attempts, and/or unauthorized access attempts, among other examples.

In some implementations, an alerting rule may include one or more data queries. A data query may be a request to a database or information system to retrieve, modify, and/or manipulate data based on one or more conditions or criteria. A data query may be expressed in a structured query language (SQL) or other query languages and allows users to filter and select data from a larger dataset for analysis or reporting, such as for security risk detection in remote data (e.g., log data 225) from the remote system 210. The data queries indicated by the one or more alerting rules may be referred to as "alert" queries.

For example, the alerting rule(s) may include the alert queries: SELECT*FROM logs WHERE log_type="sshd" AND message ILIKE "% invalid certificate %" (e.g., querying log data 225 having a log type of "sshd" and including an invalid certificate notification); SELECT*FROM logs WHERE log_type="sshd" AND message ILIKE "% login failure %" (e.g., querying log data 225 having a log type of "sshd" and including a login failure notification); SELECT*FROM logs WHERE log_type="httpd" AND message ILIKE "% Forbidden %" AND log_level="ERROR" (e.g., querying log data 225 having a log type of "httpd," including a forbidden notification, and having a log level indicating an error); and SELECT*FROM logs where log_type="auditd" AND message ILIKE "% sudo failure %" AND customer id="IDABCD" (e.g., querying log data 225 having a log type of "auditd" and including a pseudo failure notification and including a customer ID of IDABCD).

As shown by reference number 310, the local system 205 may generate a one or more selection predicates based on the one or more alerting rules. For example, the selection predicate(s) may be indicated by the one or more alerting rules. As an example, the selection predicate(s) may be indicated by and/or included in the one or more alert queries of the one or more alerting rules.

For example, each alert query may include one or more clauses. Each clause may represent a condition to be evaluated based on that alert query. For each clause within an alerting rule, the local system 205 may extract one or more components, such as a key (e.g., which is the field or attribute that the clause refers to, such as "user_id," "timestamp," "message," or "log_type"); a logical operator (LOGOP) (e.g., which is the logical operation applied to the field, such as '=', '!=', '>', '<', or 'ILIKE'); and/or a value (e.g., which is the criteria or threshold that the field is being compared against). For example, the alert query SELECT*FROM logs WHERE log_type="sshd" AND message ILIKE "% invalid certificate %" includes two clauses: (1) log_type="sshd"; and (2) message ILIKE "% invalid certificate %". Using the components from a given clause, the local system 205 may generate a selection predicate in a (key, LOGOP, value) format. For example, if an alerting rule includes a clause "user_id='admin", the corresponding selection predicate would be ('user_id', '=', 'admin').

The local system 205 may generate a selection predicate table based on the one or more selection predicates. For example, the selection predicate table may include selection predicate(s) (e.g., in the (key, LOGOP, value) format) and respective counts for the selection predicate(s) (e.g., where a count indicates a quantity of occurrences of a given selection predicate in the one or more alerting rules). For example, the local system 205 may parse the clause(s) of each alerting rule. For each selection predicate identified in the clause(s), if the selection predicate is not included in the selection predicate table, then the local system 205 may add the selection predicate to the selection predicate table (e.g., set the count for the selection predicate to one (1)). If the selection predicate is included in the selection predicate table, then the local system 205 may increase the count for that selection predicate (e.g., by a value of one (1)). The selection predicate table may serve as a reference for further data filtering and extraction processes by the local system 205. By systematically parsing the alerting rules and extracting the (key LOGOP value) selection predicates, the local system 205 ensures that the local system will accurately capture the criteria needed for security risk detection and subsequent data analysis for remote data (e.g., log data) from the remote system 210. Additionally, by creating the selection predicate table, the local system 205 may reduce the likelihood of duplicative selection predicates being created based on the alerting rule(s).

The local system 205 may perform a pre-sampling operation using sample data from the remote system 210. The pre-sampling operation may enable the local system 205 to determine data metrics based on the sample data from the remote system 210. This enables the local system 205 to filter out trivial or non-essential data from the remote system 210 and thereby optimize the data extraction process for more relevant and efficient security analysis. For example, as shown by reference number 315, the local system 205 may obtain sample data from the remote system 210. The sample data may include data to be analyzed using the one or more alerting rules. For example, the sample data may include log data, such as the log data 225.

In some implementations, the local system 205 may obtain configuration information indicating a time window and/or a data percentage for sampling data. The time window may indicate an amount of time over which the local system 205 is to obtain the sample data. The data percentage may indicate a percentage of data (e.g., obtained during the time window) that is to be included in the sample data. The local system 205 may obtain the sample data based on the configuration information. Additionally, or alternatively, the local system 205 may obtain the sample data from data stored by the local system (e.g., that was previously obtained from the remote system).

As shown in FIG. 3B, and by reference number 320, the local system 205 may determine one or more data metrics using the sample data. For example, the pre-sampling operation may include the local system 205 determining the one or more data metrics. The one or more data metrics may include a data structure of the sample data (e.g., the organization and/or types of data within the sample data) and/or data statistics (e.g., the frequency, distribution, and/or entropy levels of one or more data fields in the sample data), among other examples. The entropy level of a data field may be indicative of the amount of unpredictability or randomness in the values of the data field. For example, the entropy level may be indicative of how evenly distributed and diverse the values are within the dataset. In the context of data compression, a higher entropy level indicates that the values of the data field are less predictable and are therefore more difficult to compress, while a lower entropy level indicates more predictability and easier compression for the data field. In some implementations, the entropy level may be calculated using the Shannon entropy formula, which quantifies the unpredictability or randomness of the field values. This calculation may involve iterating over the sample data to compute the frequency distribution of each field value, followed by applying the entropy formula.

The one or more data metrics may include the data structure of the sample data. For example, the one or more data metrics may include one or more paths, files, and/or directories, among other examples, from which the same data is obtained. In some implementations, the one or more data metrics may include one or more key prefixes associated with the sample data. For example, the set of key prefixes may indicate fields or data structures that are used for querying and retrieving relevant data from the remote system 210.

As shown by reference number 325, the local system 205 may remove one or more selection predicates (e.g., from the selection predicate table) based on the one or more data metrics. For example, the local system 205 may use one or more removal conditions to evaluate whether a selection predicate (e.g., from the selection predicate table) should be removed. The local system 205 may use the one or more data metrics (e.g., from the sample data) to determine whether the one or more removal conditions are met. By the local system 205 using the sample data to evaluate the removal conditions, the local system 205 may make informed decisions about which selection predicates to retain or remove based on actual data characteristics of data retrieved from the remote system 210. This process ensures that the removal of selection predicate(s) is data-driven, thereby optimizing the predicates used for filtering to focus on the most relevant and unique data attributes while filtering out trivial or redundant information. As a result, the local system 205 may improve the efficiency and accuracy of data extraction, and/or reduce unnecessary data transfer and processing. This may result in more effective and cost-efficient security analysis of data from the remote system 210.

The one or more removal conditions may include a compression threshold, a key prefix condition, and/or a file path condition, among other examples. For example, the file path condition may indicate that if a field being queried by a selection predicate can be obtained from a file path (e.g., rather than from the content of a data file itself), then the selection predicate should be removed. For example, the local system may remove selection predicates that meet the file path condition because the local system can access such fields through efficient listing operations that do not require querying the entire dataset, thereby reducing processing overhead and increasing the efficiency of data retrieval by the local system 205. The local system 205 may determine (e.g., based on the sample data and/or the data metric(s)) that a selection predicate, from the one or more selection predicates (e.g., included in the selection predicate table), is configured to query a field that is included in a path for a file associated with the remote system 210. The local system 205 may remove the selection predicate from the set of selection predicates based on the field being included in the path (e.g., because the local system 205 can obtain or access data for the field using a listing operation rather than accessing the file itself, such that using the field for filtering may not be beneficial).

Whether the compression threshold is satisfied based on an entropy level may be indicative of whether a field is compressible (e.g., dictionary compressible). For example, the local system 205 may determine that a selection predicate, from the one or more selection predicates (e.g., included in the selection predicate table), is configured to query a field that has an entropy level (e.g., as indicated by the data metric(s) of the sample data) that satisfies the compression threshold. This may indicate that the field can be compressed (e.g., dictionary compressed). In some implementations, the local system 205 may remove the selection predicate from the set of selection predicates based on the entropy level satisfying the compression threshold. For example, the local system 205 removes selection predicates if the predicate queries a field that can be encoded via dictionary compression because this ensures the selection process focuses on high-value, unique data attributes, avoiding trivial or redundant data that is compressible. By filtering out these compressible fields, the local system 205 may prioritize more relevant and informative data for security analysis, thereby optimizing the data retrieval process and reducing unnecessary data processing and storage costs for the data obtained from the remote system 205.

In some implementations, the local system 205 may remove the selection predicate that queries a compressible field based on the key prefix condition. The key prefix condition may indicate that if a field is included in, or derived from, a key prefix, then the local system 205 may not remove the selection predicate that queries the field. For example, the local system may determine that the field (e.g., that has an entropy level that satisfies the compression threshold) is not included in the one or more key prefixes of the sample data. The local system 205 may remove the selection predicate from the set of selection predicates based on the field not being included in the one or more key prefixes. If the field is included in the one or more key prefixes, then the local system 205 may refrain from removing the selection predicate from the one or more selection predicates (e.g., from the selection predicate table). The local system 205 may not remove a selection predicate that queries a compressible field if the field is derived from the set of key prefixes because key prefixes represent paths or structures within the data storage system that are needed and/or that are relevant for security analysis. For example, the local system 205 may remove a selection predicate if the selection predicate queries a field which is encoded via dictionary compression and that encoding does not exist as a path parameter in the sample data. This improves the likelihood of the local system 205 generating filter predicate (s) that filter out compressible fields (e.g., which may have predicable values and provide less insight into the data from the remote system 210) while also ensuring that fields that exist as a path parameter in the sample data are included in the filtered data (e.g., because such fields may be needed and/or may be relevant for security analysis).

After removing the one or more selection predicate(s), the local system 205 may generate one or more filter predicates. The one or more filter predicates may include predicate(s) remaining in the selection predicate table after any removals by the local system 205 (e.g., as described in connection with reference number 330).

As shown by reference number 330, the local system 205 may generate a selection clause based on the one or more selection predicates (e.g., included in the selection predicate table generated by the local system 205 as described in connection with reference number 310). A selection clause may indicate the criteria for which data to retrieve from a dataset, using defined conditions on fields or attributes to filter the results. For example, the selection clause may indicate the fields to be obtained from the remote system based on the one or more selection predicates (e.g., included in the selection predicate table).

The local system 205 may generate the selection clause by aggregating the fields queries by the selection predicates included in the selection predicate table. Using the example alert queries described in connection with FIG. 3A, the selection clause may be "SELECT log_type, customer_id, message" to ensure that the local system 205 queries all fields (e.g., a log type field, a customer ID field, and a message field) needed to evaluate the one or more alerting rules. This ensures the selection clause is optimized for efficient data retrieval, focusing on the most relevant and informative fields for subsequent security analysis as indicated by the alerting rule(s).

As shown by reference number 335, the local system 205 may generate a filter clause based on the one or more filter predicates (e.g., generated by the local system 205 as described in connection with reference number 325). The filter clause may indicate the criteria for filtering out data from a retrieved dataset. For example, the filter clause may indicate the criteria for which data (e.g., from the data obtained based on the selection clause) is to be retrieved and/or stored by the local system 205. For example, for each filter predicate of the one or more filter predicates, the local system 205 may join filter fragments (e.g., a (key, LOGOP, value) values) associated with a data query using a logical AND operation to generate a set of joined filter fragments. For each filter predicate, the local system 205 may join all fragments for each alert query using logical AND operations. This ensures that all conditions specified within a single alert query must be met simultaneously, creating a comprehensive and specific set of criteria for data selection. For example, if an alert query includes multiple predicates, such as 'log_type='sshd'' and 'log_level='ERROR'', these predicates are joined with an AND operator, resulting in 'log_type='sshd'' AND log_level='ERROR' so long as the predicates are included in the one or more filter predicates.

The local system 205 may join the set of joined filter fragments using a logical OR operation to generate the filter clause. This ensures that data meeting any of the individual query conditions are selected by the local system 205. For example, if there are multiple joined predicates, such as 'log_type='sshd'' AND log_level='ERROR' and 'customer_id='123'' AND message ILIKE '% login failure % ", the system joins these with an OR operator, resulting in a final selection clause that reads' (log_type='sshd' AND log_level='ERROR') OR (customer_id='123' AND message ILIKE '% login failure %')". This approach to combining predicates ensures that the filter clause is both precise and inclusive, capturing all relevant data for the specified alert queries. Additionally, by the local system 205 using the one or more filter predicates to generate the filter clause, the local system 205 may include a variable amount of additional data (e.g., in addition to the data indicated by the alerting rules) by selectively removing one or more predicate(s) based on the data metrics of the sample data. By removing the one or more predicate(s) based on the data metrics of the sample data, the local system 205 may improve the likelihood that the additional data provides insightful context to the data indicated by the alerting rules and/or improves the likelihood that the amount of additional data is tailored to the data metrics of the sample data, thereby improving the efficiency and/or performance of the data retrieval process. For example, by the local system 205 generating the filter clause that is not directly tailored to the alerting rule(s) as described herein (e.g., by removing the one or more selection predicates based on the data metric (s)), the local system 205 can generate a filter clause that ensures that all data needed to evaluate the alerting rule(s) is obtained and that a variable amount of additional data is also obtained to provide additional context in an efficient manner.

As shown in FIG. 3C, and by reference number 340, the local system 205 may transmit, and the remote system 210 may receive, the selection clause and the filter clause. For example, the local system 205 may transmit, and the remote system 210 may receive, a request that is based on the set of selection predicates (e.g., generated by the local system 205 as described in connection with reference number 310) and the one or more filter predicates (e.g., generated by the local system 205 as described in connection with reference number 325). The request may include a data retrieval command. In some implementations, the local system may "push down" the predicates indicated by the selection clause and the filter clause to enable the remote system 210 to obtain and filter the data to be provided to the local system 205. For example, the request may include one or more queries (e.g., one or more SQL queries) that indicate the selection clause and the filter clause. In other examples, the request may include an API request, a data request, and/or a remote procedure call request, among other examples.

The remote system 210 may configure one or more object storage locations to filter data based on the request. For example, the remote system may configure object storage 220 and/or a storage location of log data 225 to filter data based on the request (e.g., based on the selection clause and the filter clause). The remote system 210 may obtain data (e.g., first data) based on the selection clause. For example, the remote system 210 may obtain the data based on the set of selection predicates (e.g., generated based on the alerting rule(s)). For example, the remote system 210 may select one or more fields to be obtained from the remote system 210 based on the selection clause.

As shown by reference number 345, the remote system 210 may filter the data based on the filter clause. For example, the remote system 210 may use the filter clause (e.g., the one or more filter predicates) to filter data obtained using the set of selection predicates. In other examples, the local system 205 may perform the filtering (e.g., rather than the remote system 210). As shown by reference number 350, the remote system may transmit, and the local system 205 may receive, the filtered data. For example, the filtered data may be provided by the remote system 210 based on the request from the local system 205 (e.g., that request that includes the selection clause and the filter clause).

As shown by reference number 355, the local system 205 may perform one or more actions using the filtered data. For example, the local system 205 may store the filtered data in the local system (e.g., for analysis, such as by an EUD 106). For example, the local system 205 may store the filtered data in a local cache, such as the cache 240. By storing the filtered data locally, the local system 205 may make the filtered data accessible without network-based communication (e.g., over a WAN 104 and/or a gateway), conserving network resources that would have otherwise been associated with communications over a network for analyzing the data.

Additionally, or alternatively, the local system 205 may analyze the filtered data for security event detection (e.g., for events associated with security risk indicators). For example, the local system 205 may obtain the filtered data from local storage, such as a cache. The local system 205 may identify patterns indicative of security events based on the filtered data, such as unauthorized access attempts, anomalies in user behavior, and/or potential malware activities, among other examples. The local system 205 may utilize rules-based engines, where predefined conditions and thresholds trigger alerts when met. Additionally, the local system 205 may apply statistical analyses to identify deviations from normal behavior based on the filtered data. For example, correlation engines can combine multiple data points to form a comprehensive view of potential security incidents, assessing the relationships and dependencies between various activities based on the filtered data. For real-time analysis, the local system 205 can integrate with a security system, enabling continuous monitoring and immediate response to detected threats. For example, the outcome of the analysis by the local system 205 may be used to generate alerts, reports, and/or dashboards for security analysts, providing actionable insights to mitigate identified risks promptly. Additionally, the local system 205 can automatically initiate one or more predefined responses based on detecting a security event and/or one or more security risk indicators, such as blocking an IP address or isolating a compromised system associated with the security event, to improve the security of the remote system 210.

FIGS. 3A-3C are provided as examples. Other examples may differ from what is described with regard to FIGS. 3A-3C.

Figure 4:
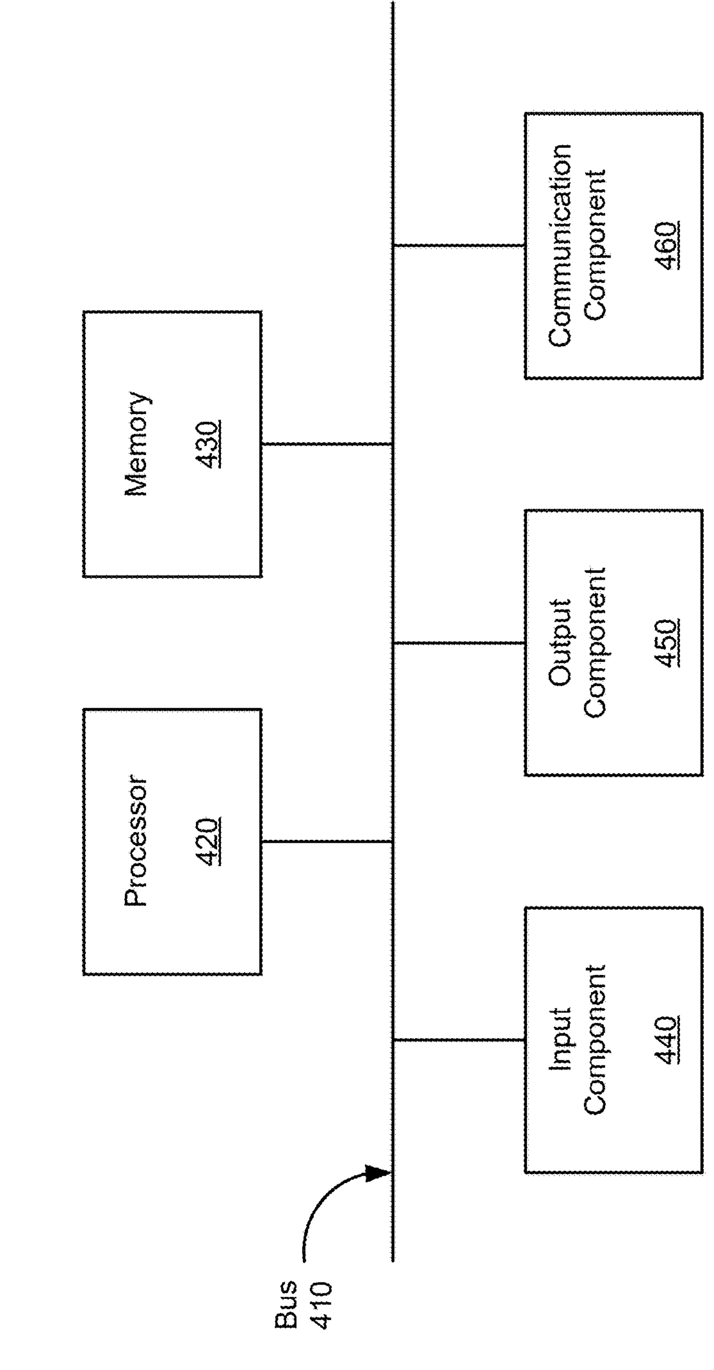
FIG. 4 is a diagram of example components of a device associated with data extraction using alert-based predicate filtering.

FIG. 4 is a diagram of example components of a device 400 associated with data extraction using alert-based predicate filtering. The device 400 may correspond to the local system 205, the remote system 210, and/or one or more devices in computing environment 100 of FIG. 1, such as the computer 102, EUD 106, the remote server 108, the public cloud 110, and/or the private cloud 112, among other examples. In some implementations, the local system 205, the remote system 210, and/or one or more devices in computing environment 100 of FIG. 1, such as the computer 102, the EUD 106, the remote server 108, the public cloud 110, and/or the private cloud 112, among other examples may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include RAM, ROM, a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
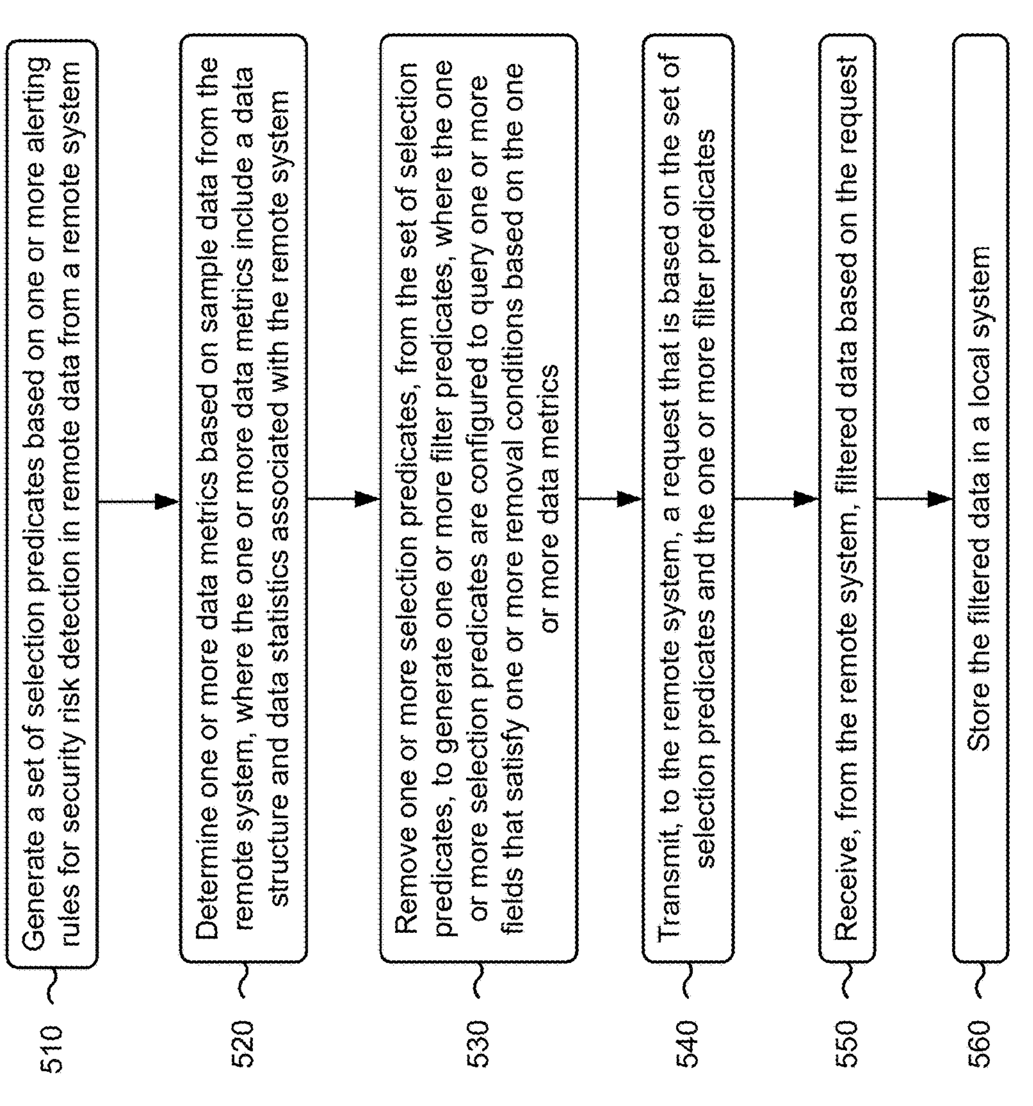
FIG. 5 is a flowchart of an example process associated with data extraction using alert-based predicate filtering.

FIG. 5 is a flowchart of an example process 500 associated with data extraction using alert-based predicate filtering. In some implementations, one or more process blocks of FIG. 5 are performed by a computer (e.g., computer 102 and/or a computer included in the local system 205). In some implementations, one or more process blocks of FIG. 5 are performed by another device or a group of devices separate from or including the computer, such as an EUD (e.g., EUD 106), a remote server (e.g., a remote server 108), a public cloud (e.g., a public cloud 110), a private cloud (e.g., a private cloud 112), and/or a device (e.g., a device 400), among other examples. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include generating a set of selection predicates based on one or more alerting rules for security risk detection in remote data from a remote system (block 510). For example, the computer may generate set of selection predicates based on one or more alerting rules for security risk detection in remote data from a remote system (e.g., the remote system 210), as described above. In some implementations, the one or more alerting rules include one or more data queries. In some implementations, the one or more data queries indicate the set of selection predicates.

As further shown in FIG. 5, process 500 may include determining one or more data metrics based on sample data from the remote system (block 520). For example, the computer may determine one or more data metrics based on sample data from the remote system, as described above. In some implementations, the one or more data metrics include a data structure and data statistics associated with the remote system.

As shown in FIG. 5, process 500 may include removing one or more selection predicates, from the set of selection predicates, to generate a one or more filter predicates (block 530). For example, the computer may remove one or more selection predicates, from the set of selection predicates, to generate a one or more filter predicates, as described above. In some implementations, the one or more selection predicates are configured to query one or more fields that satisfy one or more removal conditions based on the one or more data metrics.

As shown in FIG. 5, process 500 may include transmitting, to the remote system, a request that is based on the set of selection predicates and the one or more filter predicates (block 540). For example, the computer may transmit, to the remote system, a request that is based on the set of selection predicates and the one or more filter predicates, as described above.

As shown in FIG. 5, process 500 may include receiving, from the remote system, filtered data based on the request (block 550). For example, the computer may receive, from the remote system, filtered data based on the request, as described above.

As shown in FIG. 5, process 500 may include storing the filtered data in a local system (block 560). For example, the computer may store the filtered data in a local system (e.g., the local system 205), as described above.

Process 500 may include additional implementations, such as any single implementation or any combination of implementations described below and/or in connection with one or more other processes described elsewhere herein.

In some implementations, the one or more removal conditions include a compression threshold, and the removing of the one or more selection predicates includes determining that a selection predicate, from the one or more selection predicates, is configured to query a field, from the one or more fields, that has an entropy level that satisfies the compression threshold, and removing the selection predicate from the set of selection predicates based on the entropy level satisfying the compression threshold.

In some implementations, alone or in combination with other implementations described herein, the one or alerting rules indicate one or more key prefixes for one or more paths in the remote system, and the removing of the one or more selection predicates includes determining that the field is not included in the one or more key prefixes, and removing the selection predicate from the set of selection predicates based on the field not being included in the one or more key prefixes.

In some implementations, alone or in combination with other implementations described herein, the removing of the one or more selection predicates includes determining that a selection predicate, from the one or more selection predicates, is configured to query a field, from the one or more fields, that is included in a path for a file associated with the remote system, and removing the selection predicate from the set of selection predicates based on the field being included in the path.

In some implementations, alone or in combination with other implementations described herein, process 500 includes obtaining configuration information indicating a time window and a data percentage for sampling data, and obtaining, from the remote system, the sample data over the time window and based on the data percentage.

In some implementations, alone or in combination with other implementations described herein, process 500 includes generating a filter clause using the one or more filter predicates based on joining, for each filter predicate of the one or more filter predicates, filter fragments associated with a data query for that filter predicate using a logical AND operation to generate a set of joined filter fragments, joining the set of joined filter fragments using a logical OR operation to generate the filter clause, and where the request includes the filter clause.

In some implementations, alone or in combination with other implementations described herein, the remote system includes one or more cloud computing environments.

In some implementations, alone or in combination with other implementations described herein, process 500 includes analyzing the filtered data to identify one or more potential security threats.

In some implementations, alone or in combination with other implementations described herein, the storing of the filtered data includes storing the filtered data in a cache (e.g., the cache 240) included in the local system.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

For example, various aspects of this disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A computer program product embodiment ("CPP embodiment" or "CPP") is a term used in this disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, RAM, ROM, erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in this disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method, comprising:

generating, by a processor set, a set of selection predicates based on one or more alerting rules for security risk detection in remote data from a remote system, wherein the one or more alerting rules include one or more data queries, and wherein the one or more data queries indicate the set of selection predicates;

determining, by the processor set, one or more data metrics based on sample data, wherein the sample data is obtained from the remote system, wherein the sample data includes data to be analyzed using the one or more alerting rules, wherein the one or more data metrics include a data structure and data statistics associated with the remote system;

removing, by the processor set, one or more selection predicates, from the set of selection predicates, to generate one or more filter predicates, wherein the one or more selection predicates are configured to query one or more fields that satisfy one or more removal conditions based on the one or more data metrics;

transmitting, by the processor set and to the remote system, a request, wherein the request is based on the set of selection predicates and the one or more filter predicates;

receiving, by the processor set and from the remote system, filtered data based on the request; and storing, by the processor set, the filtered data in a local system.

2. The computer-implemented method of claim 1, wherein the one or more removal conditions include a compression threshold, and wherein the removing of the one or more selection predicates comprises:

determining that a selection predicate, from the one or more selection predicates, is configured to query a field, from the one or more fields, that has an entropy level that satisfies the compression threshold; and removing the selection predicate from the set of selection predicates based on the entropy level satisfying the compression threshold.

3. The computer-implemented method of claim 2, wherein the one or alerting rules indicate one or more key prefixes for one or more paths in the remote system, and wherein the removing of the one or more selection predicates comprises:

determining that the field is not included in the one or more key prefixes; and removing the selection predicate from the set of selection predicates based on the field not being included in the one or more key prefixes.

4. The computer-implemented method of claim 1, wherein the removing of the one or more selection predicates comprises:

determining that a selection predicate, from the one or more selection predicates, is configured to query a field, from the one or more fields, that is included in a path for a file associated with the remote system; and removing the selection predicate from the set of selection predicates based on the field being included in the path.

5. The computer-implemented method of claim 1, further comprising:

obtaining configuration information indicating a time window and a data percentage for sampling data; and obtaining, from the remote system, the sample data over the time window and based on the data percentage.

6. The computer-implemented method of claim 1, further comprising:

generating a filter clause using the one or more filter predicates based on:

joining, for filter predicate of the one or more filter predicates, filter fragments associated with a data query for the filter predicate using a logical AND operation to generate a set of joined filter fragments; and joining the set of joined filter fragments using a logical OR operation to generate the filter clause, wherein the request includes the filter clause.

7. The computer-implemented method of claim 1, wherein the remote system includes one or more cloud computing environments.

8. The computer-implemented method of claim 1, further comprising:

analyzing the filtered data to identify one or more potential security threats.

9. The computer-implemented method of claim 1, wherein the storing of the filtered data comprises: storing the filtered data in a cache included in the local system.

10. A computer system, comprising:

a processor set;

one or more computer-readable storage media; and program instructions stored on the one or more computer-readable storage media to cause the processor set to perform operations comprising:

generating a set of selection predicates based on one or more alerting rules, wherein the one or more alerting rules include one or more data queries, and wherein the one or more data queries include the set of selection predicates;

performing a pre-sampling operation to determine one or more data metrics based on sample data, wherein the sample data is obtained from a remote system, wherein the sample data includes data to be analyzed using the one or more alerting rules;

removing one or more selection predicates, from the set of selection predicates, to generate a one or more filter predicates, wherein the one or more selection predicates are configured to query one or more fields that satisfy one or more removal conditions based on the one or more data metrics;

transmitting, to the remote system, a request, wherein the request is based on the set of selection predicates and the one or more filter predicates;

receiving, from the remote system, filtered data based on the request; and performing an action using the filtered data.

11. The computer system of claim 10, wherein the performing of the action comprises:

storing the filtered data in a local cache.

12. The computer system of claim 10, wherein the performing of the action comprises:

analyzing the filtered data for security risk indicators.

13. The computer system of claim 10, wherein the one or more removal conditions include a compression threshold, and wherein the removing of the one or more selection predicates comprises:

determining that a selection predicate, from the one or more selection predicates, is configured to query a field, from the one or more fields, that has an entropy level that satisfies the compression threshold;

determining that the field is not included in one or more key prefixes for one or more paths in the remote system; and removing the selection predicate from the set of selection predicates based on the entropy level satisfying the compression threshold and based on the field not being included in the one or more key prefixes.

14. The computer system of claim 10, wherein the removing of the one or more selection predicates comprises:

determining that a selection predicate, from the one or more selection predicates, is configured to query a field, from the one or more fields, that is included in a path for a file associated with the remote system; and removing the selection predicate from the set of selection predicates based on the field being included in the path.

15. The computer system of claim 10, the performing of the pre-sampling operation comprises:

obtaining a percentage of data from the remote system over a time window to obtain the sample data, wherein the percentage of data and the time window are indicated by configuration information.

16. The computer system of claim 10, wherein the operations further comprise:

generating a filter clause using the one or more filter predicates based on:

joining, for filter predicate of the one or more filter predicates, filter fragments associated with a data query for that filter predicate using a logical AND operation to generate a set of joined filter fragments; and joining the set of joined filter fragments using a logical OR operation to generate the filter clause, wherein the request includes the filter clause.

17. A computer program product, comprising:

one or more computer-readable storage media; and program instructions stored on the one or more computer-readable storage media to perform operations comprising:

generating a set of selection predicates based on one or more alerting rules, wherein the one or more alerting rules include one or more data queries, and wherein the one or more data queries include the set of selection predicates;

performing a pre-sampling operation to determine one or more data metrics based on sample data, wherein the sample data is obtained from a remote system, wherein the sample data includes data to be analyzed using the one or more alerting rules;

removing one or more selection predicates, from the set of selection predicates, to generate a one or more filter predicates, wherein the one or more selection predicates are configured to query one or more fields that satisfy one or more removal conditions based on the one or more data metrics;

transmitting, to the remote system, a request, wherein the request is based on the set of selection predicates and the one or more filter predicates;

receiving, from the remote system, filtered data based on the request; and storing the filtered data in a local cache.

18. The computer program product of claim 17, wherein the one or more removal conditions include a compression threshold, and wherein the removing of the one or more selection predicates comprises:

determining that a selection predicate, from the one or more selection predicates, is configured to query a field, from the one or more fields, that has an entropy level that satisfies the compression threshold;

determining that the field is not included in one or more key prefixes for one or more paths in the remote system; and removing the selection predicate from the set of selection predicates based on the entropy level satisfying the compression threshold and based on the field not being included in the one or more key prefixes.

19. The computer program product of claim 17, wherein the removing of the one or more selection predicates comprises:

determining that a selection predicate, from the one or more selection predicates, is configured to query a field, from the one or more fields, that is included in a path for a file associated with the remote system; and removing the selection predicate from the set of selection predicates based on the field being included in the path.

20. The computer program product of claim 17, wherein the one or more removal conditions include at least one of:

a compression condition, or a file path condition.

* * * * *